US011786417B2

(12) United States Patent
Van Loon

(10) Patent No.: US 11,786,417 B2
(45) Date of Patent: Oct. 17, 2023

(54) PATIENT TRANSPORT APPARATUS WITH CABLE CONNECTED BRAKE AND STEER LOCK ASSEMBLIES

(71) Applicant: Stryker Corporation, Kalamazoo, MI (US)

(72) Inventor: Mackenzie Van Loon, Mattawan, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 18/097,587

(22) Filed: Jan. 17, 2023

(65) Prior Publication Data

US 2023/0149230 A1 May 18, 2023

Related U.S. Application Data

(63) Continuation of application No. 17/454,528, filed on Nov. 11, 2021, now Pat. No. 11,576,829, which is a
(Continued)

(51) Int. Cl.
*A61G 1/02* (2006.01)
*B60B 33/00* (2006.01)

(52) U.S. Cl.
CPC ......... *A61G 1/0243* (2013.01); *A61G 1/0287* (2013.01); *B60B 33/0081* (2013.01)

(58) Field of Classification Search
CPC .......... A61G 1/00; A61G 1/02; A61G 1/0237; A61G 1/0243; A61G 1/0287; B60B 33/0081
See application file for complete search history.

(56) References Cited

U.S. PATENT DOCUMENTS 2,583,858 A 1/1952 Kostolecki
4,128,144 A 12/1978 Vassar
(Continued)

FOREIGN PATENT DOCUMENTS

DE 10229929 A1 1/2004

OTHER PUBLICATIONS

English language abstract and machine-assisted English translation for DE 102 29 929 extracted from espacenet.com database on Jan. 27, 2020, 11 pages.

*Primary Examiner* — Fredrick C Conley
(74) *Attorney, Agent, or Firm* — Howard & Howard Attorneys PLLC

(57) ABSTRACT

A patient transport apparatus comprises a support structure. The support structure comprises a base, a frame, and a patient support surface to support a patient. The patient transport apparatus also includes a first and a second caster assembly respectively coupled to the support structure to facilitate movement of the support structure along a floor surface, with the first caster assembly comprising a first brake assembly and the second caster assembly comprising a second brake assembly. The patient transport apparatus also includes an actuator assembly operatively coupling the first and second brake assemblies, with the actuator assembly comprising a first and second actuator respectively operatively coupled to the first and second brake assemblies. The actuator assembly further comprises a cable assembly interconnecting the first and second actuator that places the operatively coupled first and second brake assemblies in the braked state or the unbraked state.

14 Claims, 7 Drawing Sheets

Related U.S. Application Data continuation of application No. 16/690,224, filed on Nov. 21, 2019, now Pat. No. 11,197,791.

(60) Provisional application No. 62/770,285, filed on Nov. 21, 2018.

(56) References Cited

U.S. PATENT DOCUMENTS

| | | |
|---|---|---|
| 4,349,938 A | 9/1982 | Fontana |
| 4,916,725 A | 4/1990 | Quinter et al. |
| 5,377,372 A | 1/1995 | Rudolf et al. |
| 5,450,650 A | 9/1995 | Bertrand et al. |
| 6,321,878 B1 | 11/2001 | Mobley et al. |
| 6,421,854 B1 * | 7/2002 | Heimbrock .......... A61G 7/0528 5/601 |
| 7,546,908 B2 | 6/2009 | Chang |
| 7,810,822 B2 | 10/2010 | Figel et al. |
| 8,776,314 B2 | 7/2014 | Hofrichter et al. |
| 9,862,229 B2 | 1/2018 | Hofrichter et al. |
| 11,197,791 B2 | 12/2021 | Van Loon |
| 2007/0216117 A1 | 9/2007 | Figel et al. |
| 2009/0165208 A1 | 7/2009 | Reed et al. |
| 2013/0174377 A1 | 7/2013 | Lin et al. |
| 2014/0059768 A1 | 3/2014 | Lemire et al. |
| 2014/0102834 A1 | 4/2014 | Spoor |
| 2016/0022513 A1 | 1/2016 | Spoor et al. |
| 2017/0100962 A1 * | 4/2017 | Kloss .................. B60B 33/0092 |
| 2017/0119607 A1 | 5/2017 | Derenne et al. |
| 2020/0155381 A1 | 5/2020 | Van Loon |
| 2022/0062074 A1 | 3/2022 | Van Loon |

* cited by examiner

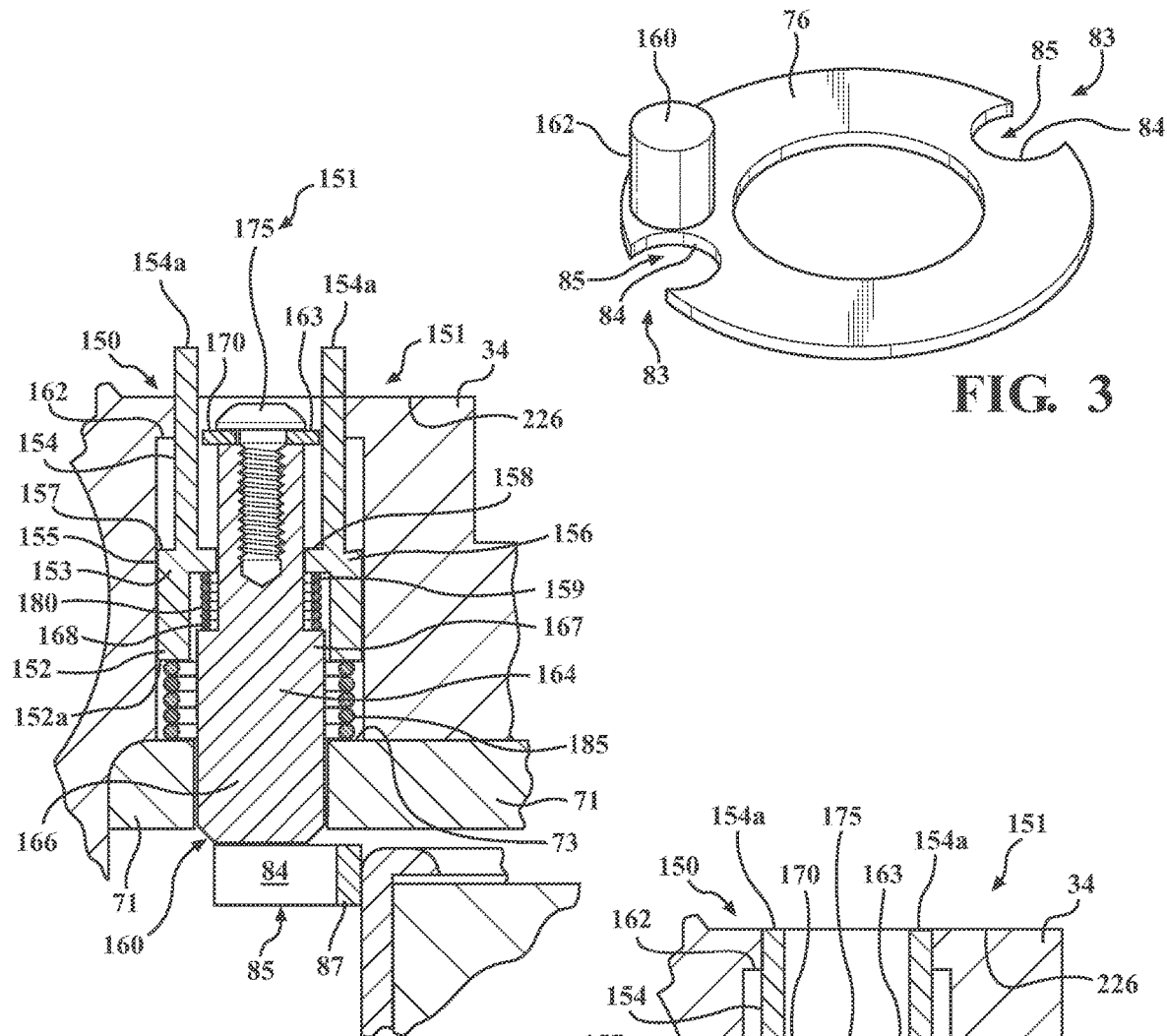
FIG. 3
FIG. 4A
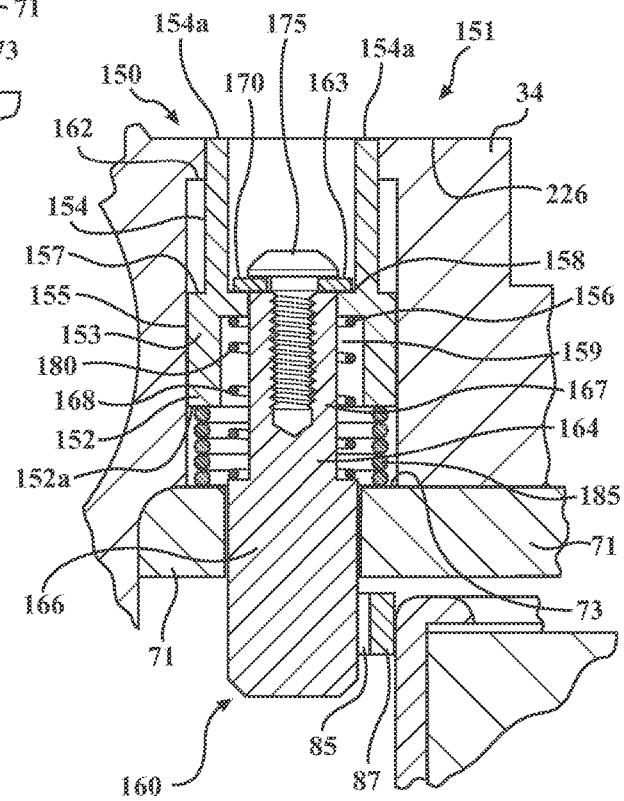
FIG. 4B

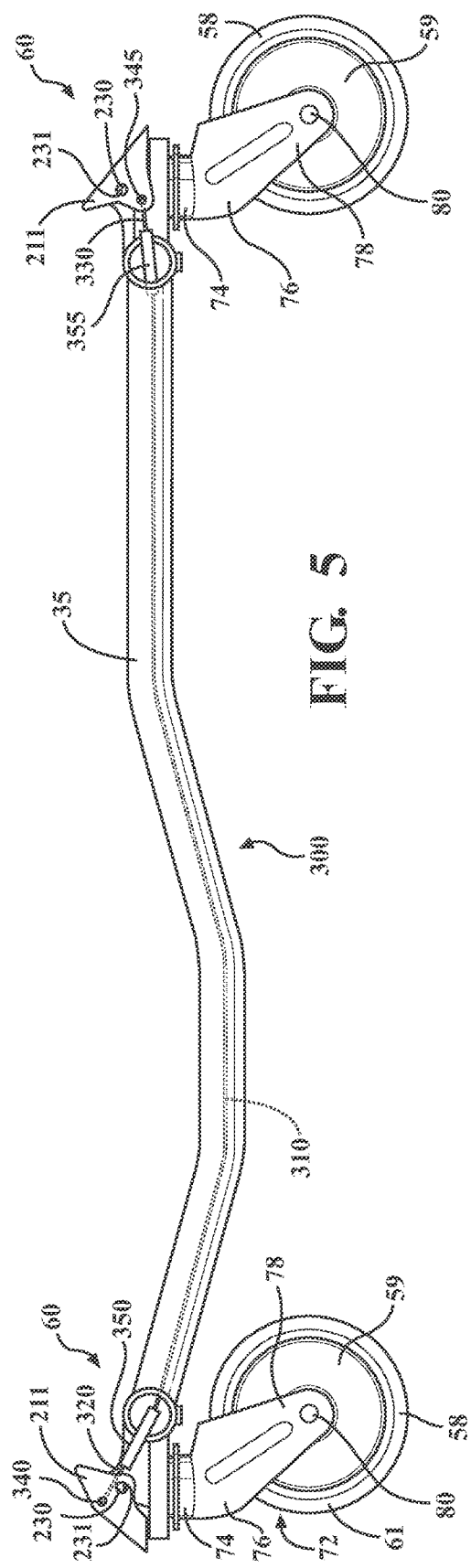
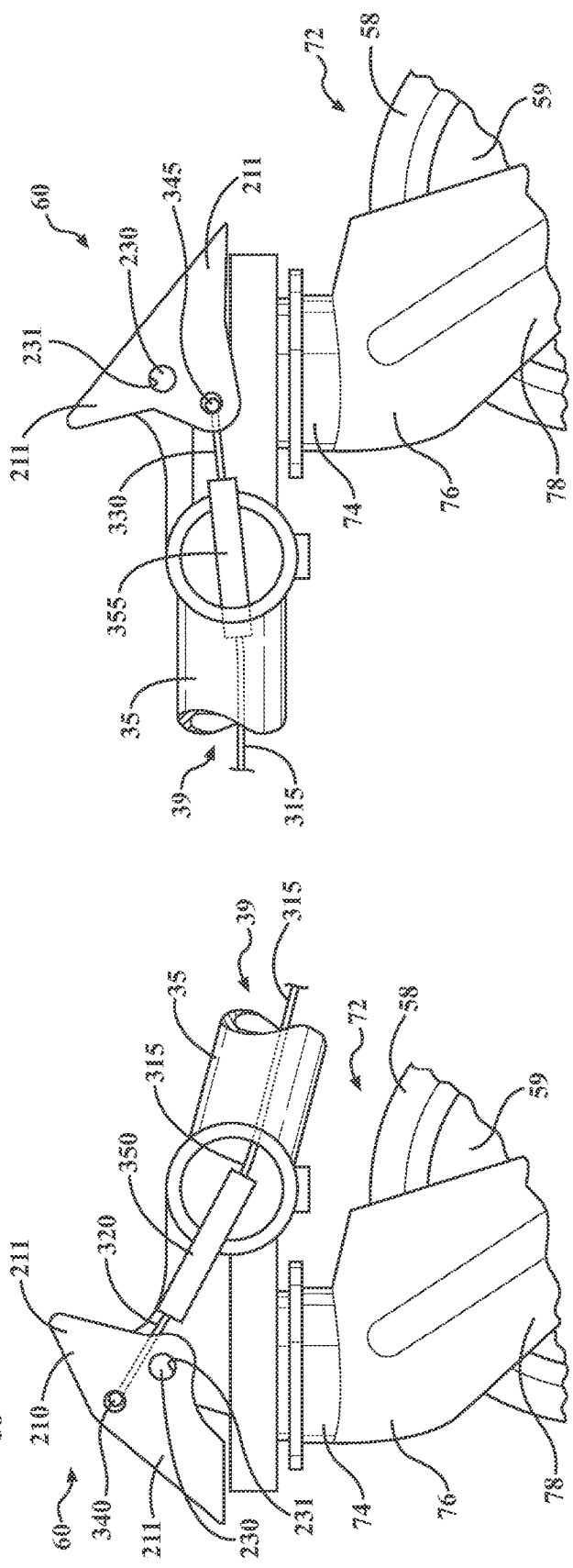

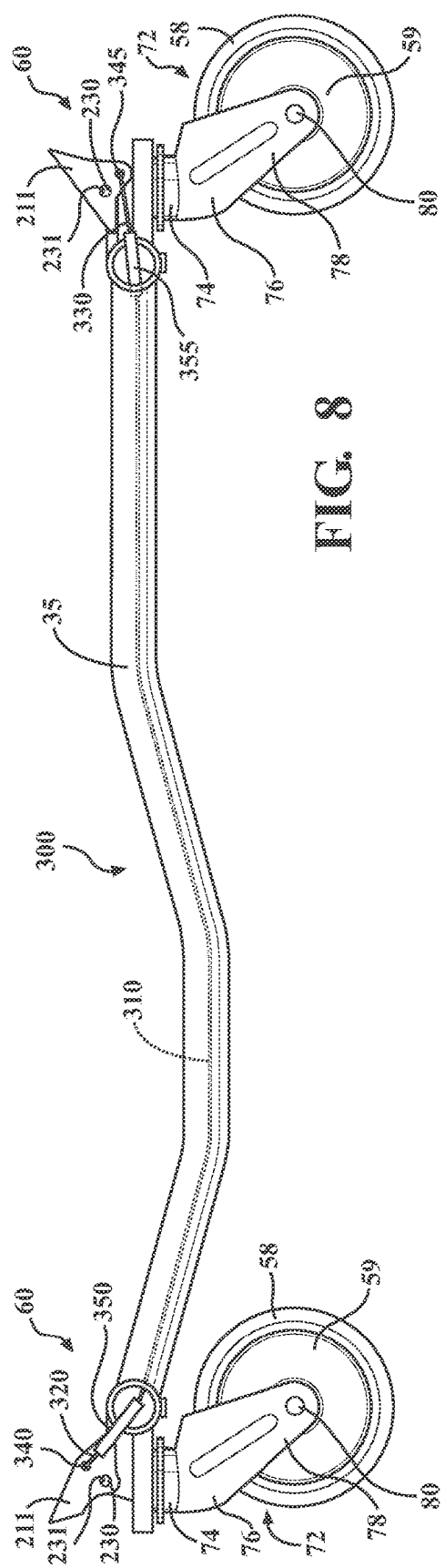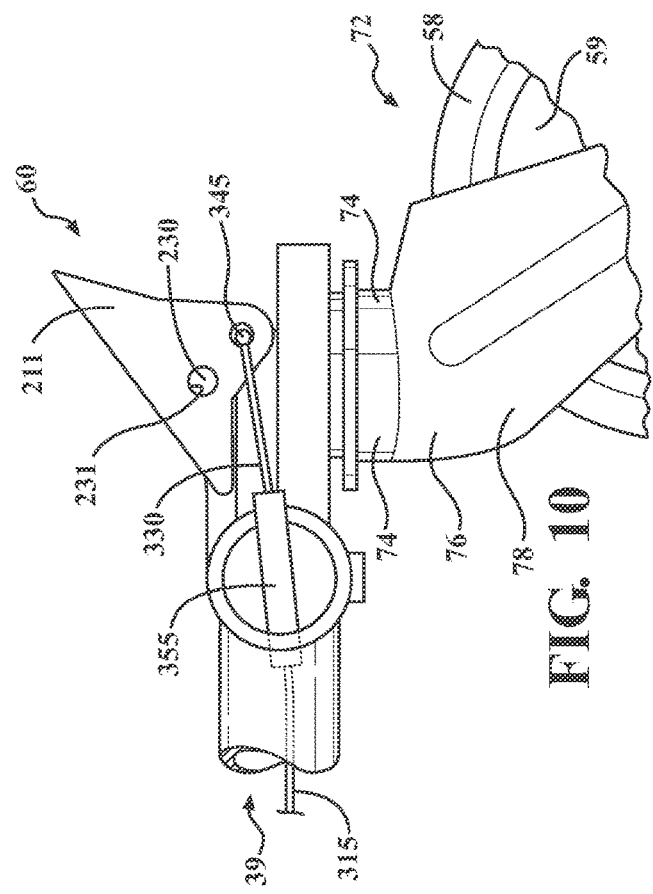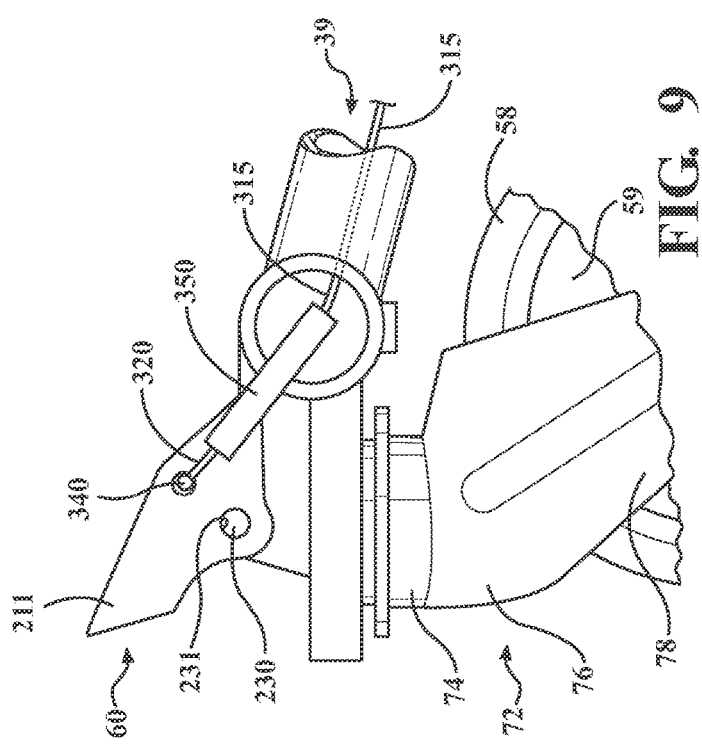

PATIENT TRANSPORT APPARATUS WITH CABLE CONNECTED BRAKE AND STEER LOCK ASSEMBLIES

CROSS-REFERENCE TO RELATED APPLICATIONS

This application is a Continuation of U.S. patent application Ser. No. 17/454,528 filed on Nov. 11, 2021, which is a Continuation of U.S. patent application Ser. No. 16/690,224 filed on Nov. 21, 2019 and issued as U.S. Pat. No. 11,197,791 on Dec. 14, 2021, which claims priority to and the benefit of U.S. Provisional Patent Application No. 62/770,285 filed on Nov. 21, 2018, the disclosures of each of which are hereby incorporated by reference in their entirety.

BACKGROUND

Patient transport apparatuses facilitate care of patients in a health care setting. Patient transport apparatuses comprise, for example, hospital beds, stretchers, cots, wheelchairs, and chairs. A conventional patient transport apparatus comprises a support structure having a base, a frame, and a patient support surface upon which the patient is supported. The patient transport apparatus may also comprise caster assemblies with caster wheels to facilitate movement of the patient transport apparatus. Often, two or more of the caster assemblies include a brake assembly to lock the caster wheels from rolling along a floor or ground surface. The caster assembly may also include a steer lock assembly to facilitate steering of the patient transport apparatus during movement. Sometimes, each brake and/or steer lock assembly must be separately actuated for each caster assembly. In other cases, the brake and/or steer lock assemblies are connected together via a mechanical linkage so that actuation of one causes actuation of the others. The linkage may be complex, rigid, and/or heavy.

A patient transport apparatus with caster assemblies designed to overcome one or more of the aforementioned challenges is desired.

BRIEF DESCRIPTION OF THE DRAWINGS

FIG. 3 is a perspective interior side view of a lock receiver of the steer lock assembly.

FIG. 4A is an illustration of the steer lock assembly with a steer lock partially engaged with the lock receiver.

FIG. 4B is an illustration of the steer lock assembly with the steer lock fully engaged with the lock receiver.

FIG. 5 is an elevational exterior side view of the cable assembly interconnecting two actuators that are operable to place the interconnected two caster assemblies in one of the neutral mode, steer locked mode, or braked mode with FIG. 5 illustrating the caster assemblies being in the braked mode.

FIG. 6 is a close-up elevational exterior side view of one of the actuators and caster assemblies in the braked mode.

FIG. 7 is a close-up elevational exterior side view of the other one of the actuators and caster assemblies in the braked mode.

FIG. 8 is an elevational exterior side view illustrating the caster assemblies being in the steer locked mode.

FIG. 9 is a close-up elevational exterior side view of one of the actuators and caster assemblies in the steer locked mode.

FIG. 10 is a close-up elevational exterior side view of the other one of the actuators and caster assemblies in the steer locked mode.

DETAILED DESCRIPTION OF THE EMBODIMENTS

Figure 1:
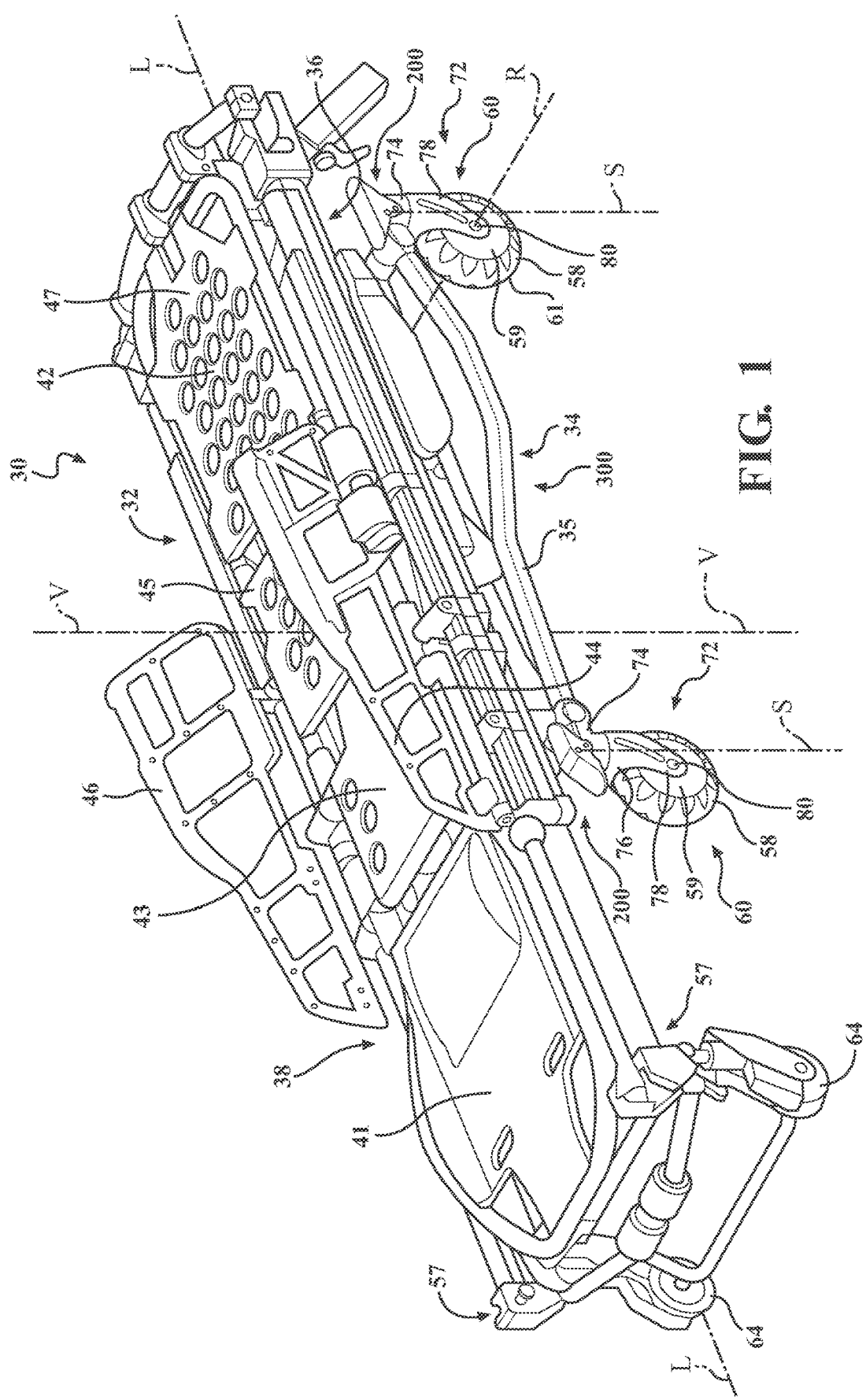
FIG. 1 is a perspective view of a patient transport apparatus with two caster assemblies having brake assemblies and steer lock assemblies interconnected by a cable assembly.

Referring to FIG. 1, a patient transport apparatus 30 is shown for supporting a patient in a health care setting. The patient transport apparatus 30 may comprise a hospital bed, stretcher, cot, wheelchair, chair, or similar apparatus utilized in the care of a patient. In the embodiment shown in FIG. 1, the patient transport apparatus 30 comprises a cot that is utilized to transport patients, such as from an emergency site to an emergency vehicle (e.g., an ambulance).

The patient transport apparatus 30 shown in FIG. 1 comprises a support structure 32 that provides support for the patient. The support structure 32 comprises a base 34 and a support frame 36. The base 34 comprises a base frame 35. The support frame 36 is spaced above the base frame 35. The support structure 32 also comprises a patient support deck 38 disposed on the support frame 36. The patient support deck 38 comprises several sections, some of which are capable of articulating relative to the support frame 36, such as a back section 41, a seat section 43, a leg section 45, and a foot section 47. The patient support deck 38 provides a patient support surface 42 upon which the patient is supported.

The base 34, support frame 36, patient support deck 38, and patient support surface 42 each have a head end and a foot end corresponding to designated placement of the patient's head and feet on the patient transport apparatus 30. The support frame 36 comprises a longitudinal axis L along its length from the head end to the foot end. The support frame 36 also comprises a vertical axis V arranged crosswise (e.g., perpendicularly) to the longitudinal axis L along which the support frame 36 is lifted and lowered relative to the base 34. The construction of the support structure 32 may take on any known or conventional design, and is not limited to that specifically set forth above. In addition, a mattress (not shown) may be provided in certain embodiments, such that the patient rests directly on a patient support surface of the mattress while also being supported by the patient support surface 42.

Side rails 44, 46 are coupled to the support frame 36 and thereby supported by the base 34. A right side rail 44 is positioned at a right side of the support frame 36. A left side rail 46 is positioned at a left side of the support frame 36 (with the left side defined relative to a person positioned at the head end of the support frame 36 and facing the support frame 36). If the patient transport apparatus 30 is a hospital bed there may be more side rails. The side rails 44, 46 may be fixed to the support frame 36 or may be movable between a raised position in which they block ingress and egress into and out of the patient transport apparatus 30, one or more intermediate positions, and a lowered position in which they are not an obstacle to such ingress and egress. In still other configurations, the patient transport apparatus 30 may not include any side rails.

A pair of handle assemblies 57 may also be coupled to the support frame 36 at a position near the head end of the bed that may be raised for use in transporting the patient transport apparatus 30, particularly when the apparatus 30 is in the lowered position. The handle assemblies 57 may also be lowered to a stowed position when not in use.

Wheels 58 are coupled to the base 34 to facilitate transport over floor surfaces. The wheels 58 are arranged in each of four quadrants of the base 34 adjacent to corners of the base frame 35. In the embodiment shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some embodiments, the wheels 58 are not caster wheels and may be non-steerable, steerable, non-powered, powered, or combinations thereof. Additional wheels are also contemplated. For example, the patient transport apparatus 30 may comprise four non-powered, non-steerable wheels, along with one or more powered wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient transport apparatus 30. A fifth wheel may also be arranged substantially in a center of the base 34.

A pair of loading wheels 64 may be coupled to the support frame 36 to assist with loading of the patient transport apparatus 30 into the emergency vehicle and unloading of the patient transport apparatus 30 out of the emergency vehicle. In the embodiment shown, the loading wheels 64 are arranged nearer the head end than the foot end, but the loading wheels 64 may be placed in other locations to facilitate loading and/or unloading of the patient transport apparatus 30 into and out of the emergency vehicle, or for other purposes.

In one embodiment, each of the wheels 58 comprises a wheel hub 59 and an outer wheel portion 61 surrounding the wheel hub 59. The outer wheel portion 61 has an outer end surface 63 (see FIG. 2A), at least part of which is arranged to contact the floor surface F when rolling along the floor surface F.

The caster assembly 60 further comprises a wheel support 72 and a caster stem 74 (see FIG. 5). The wheel support 72 is arranged to support the wheel 58 for rotation about a rotational axis R (see FIG. 1) and for swiveling about a swivel axis S, with the swivel axis S generally normal to the floor surface F and to the rotational axis R. The wheel support 72 may comprise various types of support structures. In the embodiment shown, the wheel support 72 comprises a fork 78 and a neck 76 fixed to the fork 78. The wheel 58 is secured to the fork 78 via an axle 80 (see FIGS. 1 and 5) passing through the wheel hub 59. The axle 80 is attached to the fork 78. The wheel 58 is arranged to rotate about the rotational axis R defined by the axle 80. The wheel 58 may rotate relative to the axle 80 via a wheel bearing (not shown) or, in alternative embodiments, the wheel 58 may be fixed to the axle 80 to rotate with the axle 80 relative to the fork 78. Other configurations that allow the wheel 58 to rotate about the rotational axis R and roll along the floor surface F are contemplated.

Figure 2A:
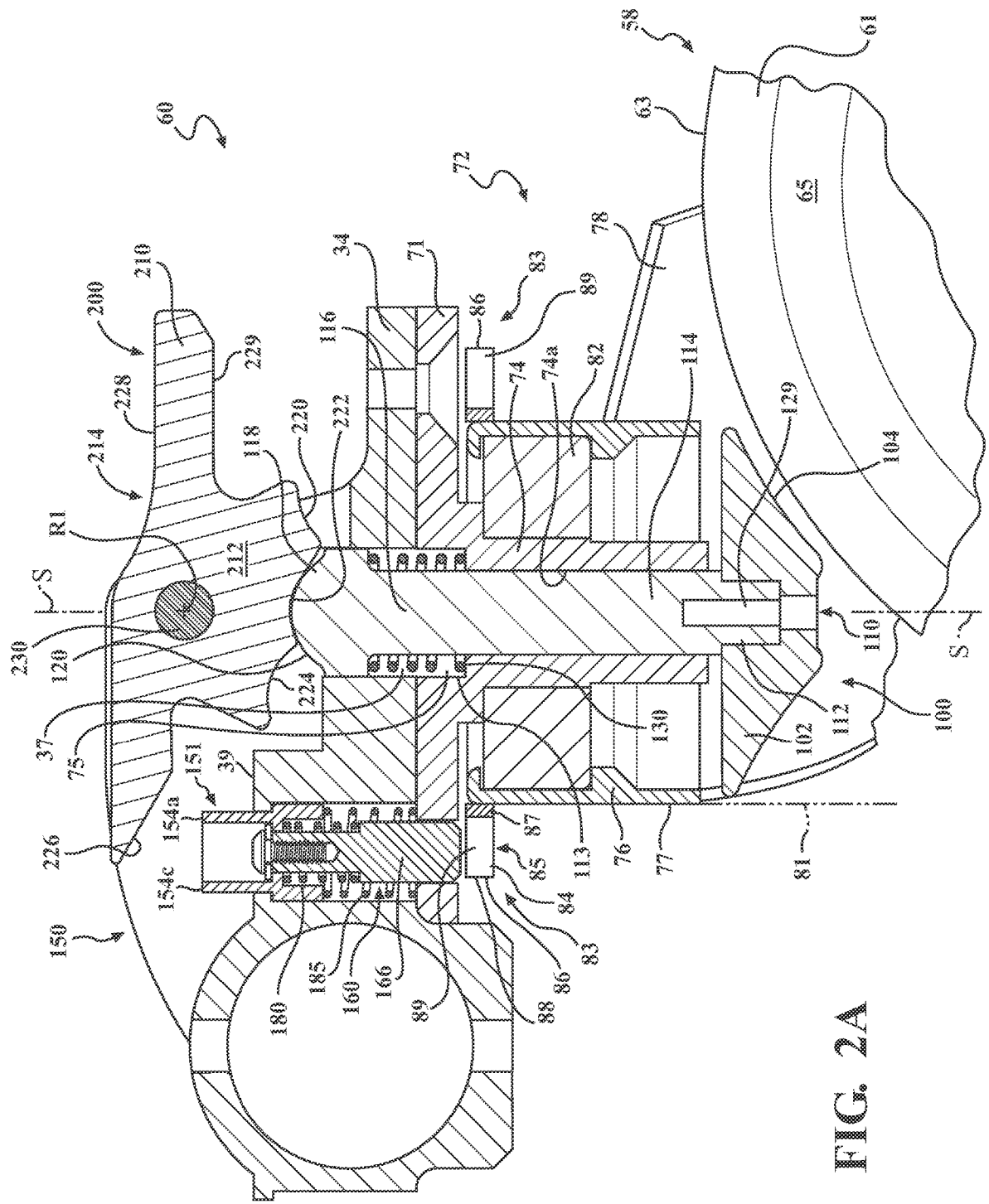
FIG. 2A is a cross-sectional interior side view illustrating one of the caster assemblies in a neutral mode in which the brake assembly is in an unbraked state and the steer lock assembly is in a non-steer locked state.
Figure 2B:
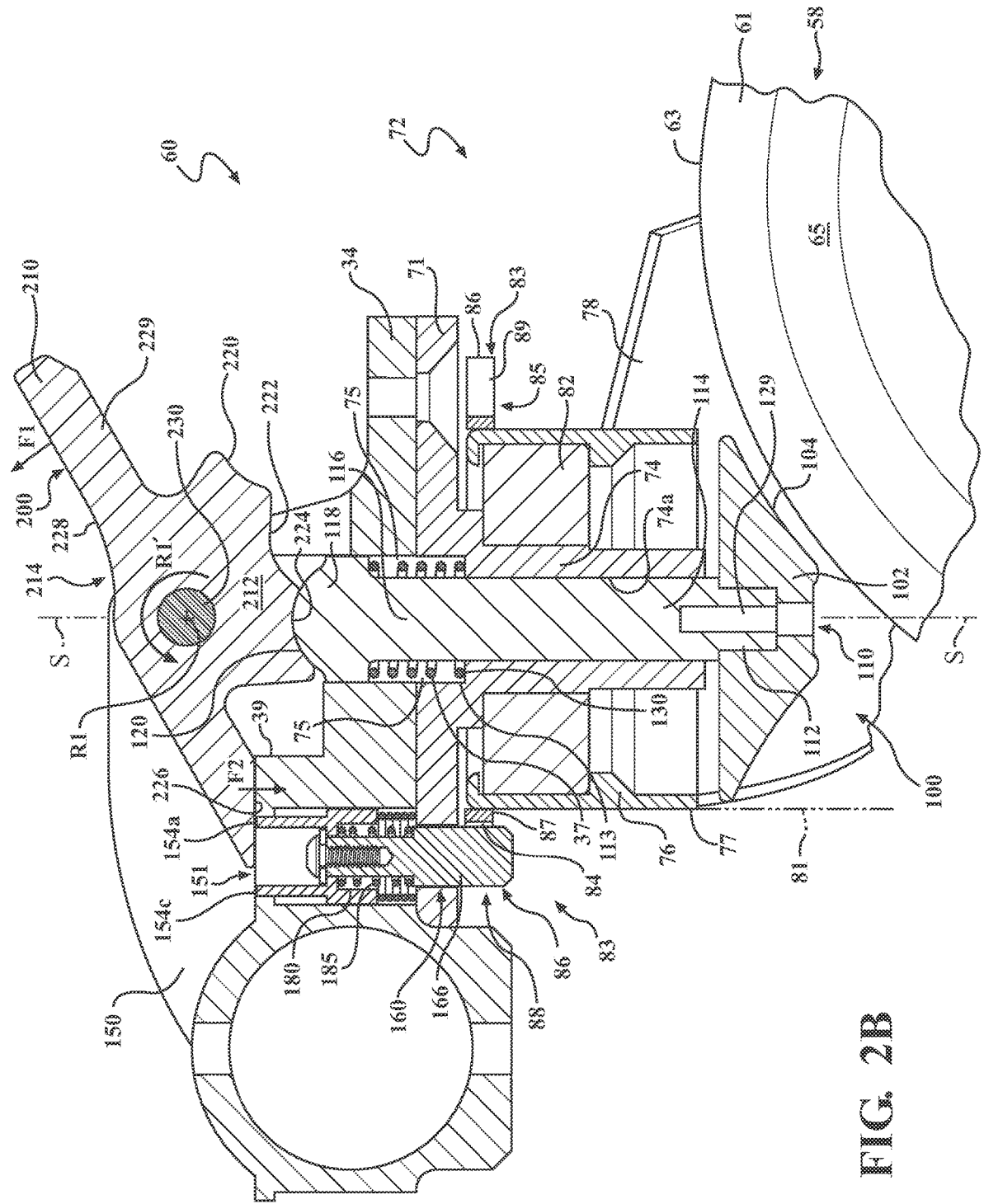
FIG. 2B is a cross-sectional interior side view illustrating the caster assembly of FIG. 2A in a steer locked mode in which the brake assembly is in the unbraked state, and the steer lock assembly is in a steer locked state.
Figure 2C:
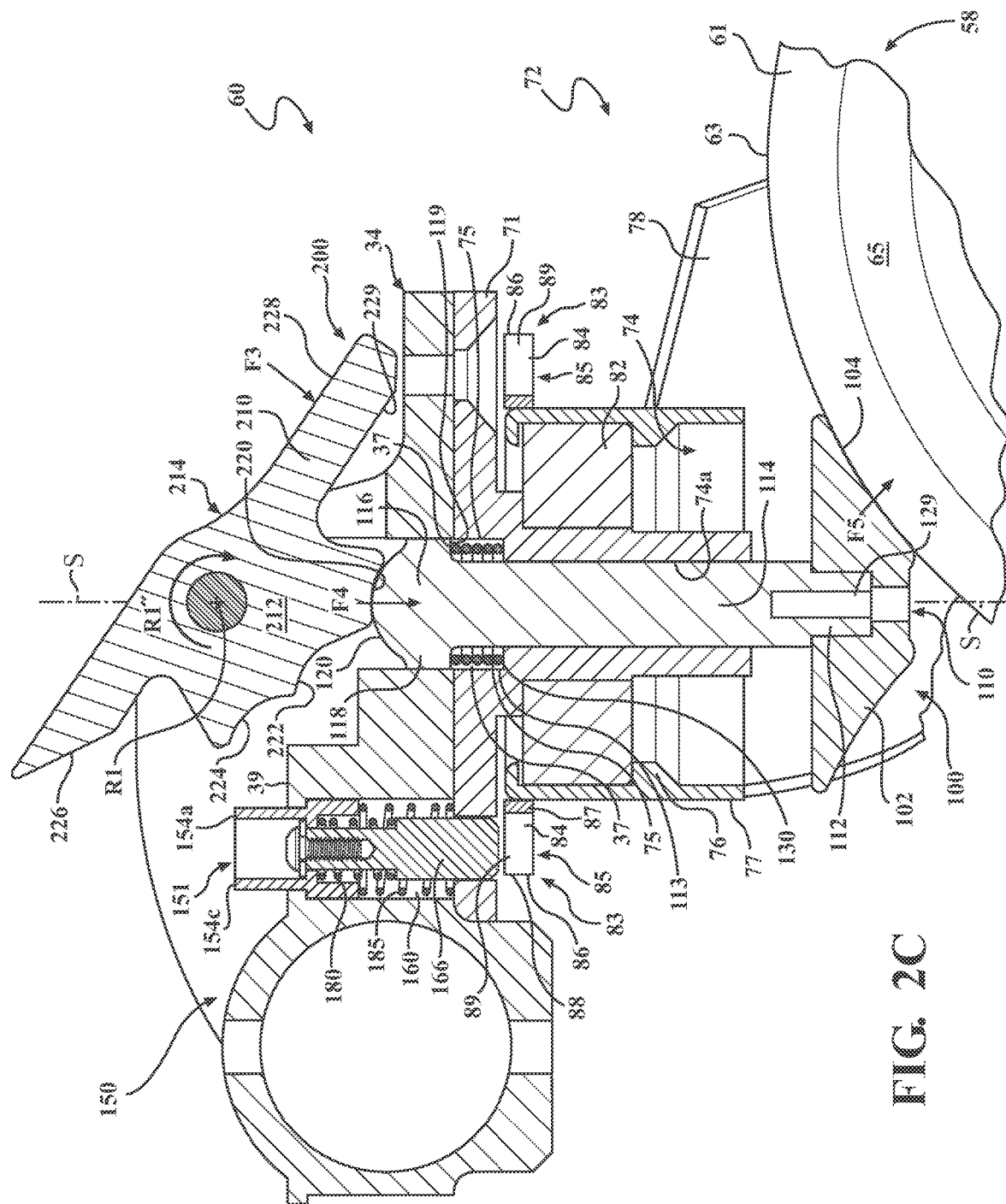
FIG. 2C is a cross-sectional interior side view illustrating the caster assembly of FIG. 2A in a braked mode in which the brake assembly is in the braked state, and the steer lock assembly is in the non-steer locked state.

As best shown in FIGS. 2A-2C, the stem 74 is fixed to the base 34 of the patient transport apparatus 30 such that the stem 74 is unable to swivel about the swivel axis S or otherwise move relative to the base frame 35 and the base 34. The stem 74 is hollow, and includes an interior surface 74A defining an interior space 75. The stem 74 can also define the swivel axis S.

The neck 76 is coupled to the stem 74 via a bearing 82 so that the neck 76 is able to swivel relative to the stem 74 about the swivel axis S when the wheel 58 is changing orientation. An outer surface 77 of the neck 76 may generally define an outer tangential plane 81 that extends between the floor F and the base 34. Owing to the fixed connection between the neck 76 and the fork 78, the fork 78, neck 76 and wheel 58 are also able to swivel relative to the stem 74 about the swivel axis S. Fasteners, press-fit connections, welding, and/or other structures may be present to secure the stem 74 to the base 34, as is conventional in the art. The stem 74 may also be referred to as a kingpin, spindle, post, or the like. Additionally, a collar, sleeve, flange, or other suitable structure (referred to hereinafter as flange 71) may be fixed to the stem 74 (or may be integrally formed with the stem 74) and located between the stem 74 and the base 34 to further support the stem 74.

In certain embodiments, the stem 74, flange 71 and base 34 may be separate components that are fixed together or may be a single integrally formed component. In still further embodiments, the stem 74 and flange 71 may be integrally formed and separate from, but affixed to, the base 34, while in even further embodiments the flange 71 and base 34 are integrally formed and separate from, and affixed to, the stem 74. As illustrated in FIGS. 2A-2C, the flange 71 and the stem 74 are formed as a single piece, and the flange 71 is positioned adjacent to, and fixed to, a portion of the base 34.

In the embodiment shown, the neck 76 and fork 78 form one type of swivel assembly that provides a swivel joint for the caster assembly 60. Other swivel assemblies that allow the wheel 58 to swivel relative to the base 34 are also possible.

In certain embodiments, the two or more caster assemblies 60 include a steer lock assembly 150, which is respectively configured to facilitate preventing the caster assembly 60, and more specifically the wheel 58 of the caster assembly 60, from swiveling about the swivel axis S, with the steer lock assembly 150 being operable between a steer locked state and a non-steer locked state. In certain of these embodiments, two or more of the caster assemblies 60 also includes a brake assembly 100, which is respectively configured to facilitate braking of the wheel 58 about the rotational axis R, with the brake assembly 100 being operable between a braked state and an unbraked state. In certain embodiments, the two or more caster assemblies 60 including the steer lock assembly 150 are the same two or more caster assemblies 60 also including the respective brake assemblies 100.

FIGS. 2A-2C show these states of one of the steer lock assemblies 150 and brake assemblies 100, and these combinations of various states create modes of the patient transport apparatus 30. More specifically, FIG. 2A shows a neutral mode in which the steer lock assembly 150 is in the non-steer locked state and in which the brake assembly 100 is in an unbraked state. FIG. 2B shows a steer locked mode in which the steer lock assembly 150 is in the steer locked state and in which the brake assembly 100 is in an unbraked state. FIG. 2C shows a braked mode in which the steer lock assembly 150 is in the non-steer locked state and in which the brake assembly 100 is in a braked state.

The non-steer locked state, as shown in FIGS. 2A and 2C, refers to a positioning of the steer lock assembly 150 relative to the wheel 58 wherein the steer lock assembly 150 does not impede the rotation of the wheel 58 about its swivel axis S. Conversely, the steer locked state, as shown in FIG. 2B, places the steer lock assembly 150 in a position relative to the wheel 58 that impedes the rotation of the wheel 58 about swivel axis S to assist a user in steering the patient transport apparatus 30 along the floor surface F. The braked state, as shown in FIG. 2C, refers to a positioning of the brake assembly 100 relative to its wheel 58 wherein a brake pad 102 of the brake assembly 100 is engaged with the outer end surface 63 of the wheel 58 so as to prevent the rotation of the wheel 58 about its rotational axis R. Conversely, the unbraked state, as shown in FIGS. 2A and 2B, refers to a positioning of the brake assembly 100 relative to its wheel 58 wherein the brake pad 102 of the brake assembly 100 is not engaged with the outer end surface 63 of the wheel 58, thereby allowing free rotation of the wheel 58 about its rotational axis R.

In the embodiments shown, the two or more caster assemblies 60 each respectively include an actuator 200 (i.e., a first actuator and a second actuator) to change the mode of operation of the patient transport apparatus 30. More specifically, the actuator 200 is operable to place the steer lock assembly 150 in a non-steer locked state or a steer locked state and is also operable to place the brake assembly 100 in a braked stated or an unbraked state. Still further, in the embodiments shown, a respective pair of the actuators 200 of the two or more caster assemblies 60 are operationally linked together utilizing a cable assembly 300.

In certain embodiments, including the embodiments shown in the Figures provided herein, the actuator 200 is in the form of a foot pedal 210. As shown in FIGS. 2A-2C and 4A-4B, the foot pedal 210 includes a body having a profile that defines adjacent first, second and third notched regions 220, 222, 224 that are shaped to be separately respectively engageable with the brake assembly 100 in either the braked state or the unbraked state, as will be described in further detail below. The body also includes an additional steer lock engaging region 226 distinct from the adjacent first, second and third notched regions 220, 222, 224 that is shaped to be engageable with the steer lock assembly 150 in the steer locked state. Still further, the foot pedal 210 includes an upper foot engagement region 228 and a lower foot engagement region 229, distinct from the adjacent first, second and third notched regions 220, 222, 224 and the steer lock engaging region 226, that are configured to be engaged by the foot of a caregiver to apply a force to the foot pedal 210.

In certain embodiments, the outer side profile of the foot pedal 210, when viewed as an interior side sectional view as provided in FIGS. 2A-2C and 4A-4B, may be different than the outer profile as viewed along an exterior side view as provided in FIGS. 1 and 5-10. In further embodiments, the outer side profile of the foot pedal 210 may be consistent when viewed as an interior side sectional view or an exterior side view. Accordingly, the exemplary embodiment as illustrated in FIGS. 1-10, while providing the functionality and operation for the patient transport apparatus 30 as provided herein, are merely representative of one exemplary embodiment of the foot pedal 210 that can be utilized.

The foot pedal 210 is mounted to the base frame 35, shown here as mounted to the base 34, via an axle pin 230 passing through an opening. The axle pin 230 is attached to the base frame 35 or base 34. The foot pedal 210 is arranged to rotate about a pivot axis R1 (in either a counterclockwise direction R1' or clockwise direction R1" as shown in FIGS. 2B and 2C) defined by the axle pin 230 (i.e., the axle pin 230 defines the pivot axis R1) upon force F3 being applied to the upper foot engagement region 228, or force F1 being applied to the lower foot engagement region 229, so as to move the respective one of the caster assemblies 60 between the neutral mode, the steer locked mode and the braked mode, as will be further explained below. The foot pedal 210 may optionally rotate relative to the axle pin 230 about pivot axis R1 via a foot pedal bearing (not shown).

The brake pad 102 has an engaging surface 104 shaped to engage the outer end surface 63 of the wheel 58 in the braked position (see FIG. 2C). The brake pad 102 is coupled to a bottom end 112 of a plunger 110, and more typically is secured to the bottom end 112 of the plunger 110 via a pin 129.

The plunger 110 includes a middle portion 114 extending between a bottom portion 112 and a top portion 116. The middle portion 114 of the plunger 110 is at least partially contained within the interior region 75 of the stem 74, while the top portion 116 is positioned within a first cavity 37 defined within the base 34, the flange 71, or a combination of the flange 71 and the base 34 (see FIGS. 2A-2C).

The top portion 116 include a shoulder region 118 and also includes an engaging outer surface 120 that is engageable with the foot pedal 210 to move the brake assembly 100 of the associated caster assembly 60 between the braked state and the unbraked state, as will be described further below.

The brake assembly 100 also includes a brake biasing device, here a ring shaped spring 130, positioned within the first cavity 37 that is engaged between the lower outer surface 119 of the shoulder region 118 and a top shelf surface 113 of the stem 74 extending transverse to the interior surface 74A. The spring 130 normally biases the plunger 110 such that the brake pad 102 is disengaged from the outer surface 63 of the wheel 58, corresponding to the unbraked state (see FIGS. 2A and 2B).

The engagement of the brake pad 102 to the outer end surface 63 of the wheel 58, and conversely the disengagement of the brake pad 102 from the outer end surface 63 of the wheel 58 is accomplished when the user applies force to one of the upper or lower foot engagement regions 228, 229 to rotate around the pivot axis R1 in a clockwise or counterclockwise direction so that a desired one of the first, second or third notched regions 220, 222, 224 is engaged with the engaging outer surface 120 of the plunger 110.

Specifically, as shown in FIG. 2C, when the user applies force F3 to move the foot pedal 210 (i.e., rotates the foot pedal 210 about the pivot axis R1 in the clockwise direction R1") such that the first notched region 220 is positioned adjacent to the engaging outer surface 120 of the plunger 110, a downward force F4 is applied from foot pedal 210 on the engaging outer surface 120 of the shoulder 118 of the plunger 110. This force F4 moves the plunger 110 such that the lower outer surface 119 of the shoulder region 118 of the plunger 110 exerts compressive force on the annular spring 130 between the top shelf surface 113 of the stem 74 and the lower outer surface 119. The movement of the plunger 110 within the cavity 37 downward towards the wheel 58 also causes the movement of the coupled brake pad 102 downward to a position wherein it is engaged with the outer surface 63 of the wheel 58 and exerts a force F5 on the outer surface 63 (corresponding to the force F4), thereby preventing the wheel 58 from rotating freely about rotational axis R in a clockwise or counterclockwise direction upon force being applied to the patient transport device 30 to move the patient transport apparatus 30 along the floor surface F.

Conversely, referring to FIG. 2B, when the user applies force F1 to move the foot pedal 210 (i.e., rotates the foot pedal 210 about the pivot axis R1 in the counterclockwise direction R1') from the first notched region 220 to rotate the foot pedal such that the second notched region 222, or third notched region 224 is positioned adjacent to the engaging outer surface 120 of the plunger 110, the force F4 is relieved, and the biasing force of the annular spring 130 moves the plunger 110 upward within the cavity 37 such that the braked pad 102 is disengaged from the outer end surface 63 of the wheel 58, wherein the wheel 58 is free to rotate about rotational axis R in a clockwise or counterclockwise direction.

As best illustrated in FIGS. 2A-2C and 3, the steer lock assembly 150 comprises a lock receiver 83 that extends outwardly in a direction away from the swivel axis S and generally parallel to the floor surface F. In certain embodiments, such as shown in FIGS. 2A-2C, the lock receiver 83 may be a part of, or integrally formed with, the neck 76. Alternatively, the lock receiver 83 may be coupled to and extend outwardly away from an outer surface 77 of the neck 76. Regardless of whether the lock receivers 83 are integrally formed with the neck 76 or a separate structure coupled to the neck 76, the lock receivers 83 swivel about the swivel axis S in conjunction with the neck 76, fork 78 and wheel 58.

Each of the lock receivers 83 includes an inner surface 84 defining one or more openings 85, such as one or more notches. The openings 85 are respectively sized and shaped to receive a locking element, such as a steer lock pin 160 of the steer lock assembly 150 so as to prevent the rotation of the neck 76, fork 78 and wheel 58 about the swivel axis S, when the steer lock assembly 150 is in the steer locked mode (as shown and described below in conjunction with FIG. 2B).

The trailing position of the wheels 58, as is well understood by one of ordinary skill, refers to the positioning of the wheels 58 of the caster assemblies 60 such that the wheel planar surfaces WS of the side surfaces 65 are parallel to the longitudinal axis L and typically occurs when the patient transport apparatus 30 is being, or has been, pushed or pulled in a direction along the longitudinal axis L by a user for a sufficient distance wherein the caster assemblies 60 have rotated about the swivel axis S, with the wheels 58 offset from the swivel axis S in a position opposite the direction of force along the longitudinal axis L. Thus, for example, as shown in FIG. 1, the wheels 58 are positioned in a leading position relative to the head end of the patient transport apparatus 30, and in a trailing position relative to the foot end of the patient transport apparatus 30, which is generally indicative wherein the user has last applied force in a direction towards the foot end of the patient transport apparatus 30.

As best shown in FIGS. 4A and 4B, the steer lock assembly 150 includes a plunger, such as hollow sleeve member 151. The hollow sleeve member 151 includes a lower portion 152, an upper portion 154, and a ledge portion 153 extending transverse to, and between, the lower portion 152 and the upper portion 154. The ledge portion 153 includes an outer ledge portion 155 and an inner ledge portion 156. The outer ledge portion 155 includes an upper exterior ledge surface 157. The inner ledge portion 156 includes an upper interior ledge surface 158 and an opposing lower interior ledge surface 159.

The upper portion 154 of the hollow sleeve member 151 includes a terminal upper surface 154a that is shaped to be engageable with the foot pedal 210 to position the steer lock assembly 150 in the steer locked state, as will be described further below.

The steer lock pin 160 has a middle pin portion 164 extending between an upper pin portion 162 and lower pin portion 166. The middle pin portion 164 includes a stepped region 167 having an upper step surface 168. A washer 170 is seated on an upper surface 163 of the upper pin portion 162.

The steer lock assembly 150 further comprises a fastening device, shown in FIGS. 2A-2C, 4A and 4B as a screw 175, that is secured to the upper pin portion 162 of the steer lock pin 160 such that the washer 170 is positioned between the head 177 of the screw 175 and the upper pin portion 162 of the steer lock pin 160. The washer 170 acts to limit movement of the steer lock pin 160 relative to the hollow sleeve member 151 by virtue of being sized larger than an opening in the inner ledge portion 156 through which the upper pin portion 162 moves. It also allows the hollow sleeve member 151 to withdraw the steer lock pin 160 from the opening 85 by virtue of being engaged by the inner ledge portion 156 when the hollow sleeve member 151 returns to the non-steer locked state as described below.

The steer lock assembly 150 also includes two biasing devices, shown best in FIGS. 4A and 4B as a first steer lock spring 180 and a second steer lock spring 185, respectively, which may be compression springs or other suitable springs. The first steer lock spring 180 is positioned between the upper step surface 168 and the lower interior ledge surface 159, while the second steer lock spring 185 is positioned between an upper shelf surface 73 of the flange 71 and a lower portion surface 152a of the lower portion 152 of the hollow sleeve member 151.

When the caster assembly 60 is in the steer locked state, corresponding to the steer locked mode of the patient transport apparatus 30 as illustrated in FIGS. 2B and 4B, the steer lock pin 160 is axially aligned with one of the openings 85, or notches, of the lock receiver 83. This occurs when the wheel 58 of the associated caster assembly 60 is positioned in the leading or trailing position relative to the head end of the patient transport apparatus 30.

To place the caster assembly 60 in the steer locked state, the steer lock engaging region 226 of the foot pedal 210 is brought into contact with the terminal upper surface 154a and a downward force F2 is applied on the hollow sleeve member 151 to move it towards the lock receiver 83. In so doing, referring to FIG. 4A, the lower portion surface 152a moves towards the upper shelf surface 73 of the flange 71, compressing the second steer lock spring 185. In addition, the movement of the hollow sleeve member 151 also moves the lower interior ledge surface 159 towards the upper step surface 168 of the middle pin portion 164, thereby compressing the first steer lock spring 180. The compression of the first steer lock spring 180 applies a downward force on the steer lock pin 160 sufficient to move the lower pin portion 166 toward the lock receiver 83. FIGS. 3 and 4A illustrate the situation in which the wheel 58 is not yet in a trailing orientation. In this case, the first steer lock spring 180 applies a biasing force against the steer lock pin 160 so that the steer lock pin 160 is biased against an upper surface of the lock receiver 83. However, the steer lock pin 160 is not yet axially aligned with the opening 85. Once the wheel 58 is oriented in the trailing orientation, then the steer lock pin 160 becomes axially aligned with the opening 85 and is biased into the opening 85, owing to the biasing force from the first steer lock spring 180, as shown in FIG. 4B. Once the steer lock pin 160 is in the opening, the lock receiver 83, the neck 76 and the wheel 58 are limited or prevented from swiveling about the swivel axis S.

Conversely, when the patient support apparatus 30 is in the non-steer locked state, corresponding to either the neutral mode illustrated in FIG. 2A or the braked mode illustrated in FIG. 2C, the steer lock engaging region 226 of the foot pedal 210 is not in contact with the terminal upper surface 54 and is therefore not applying a downward force F2 on the hollow sleeve member 151 to move it towards the lock receiver 83. As such, the compression on the steer lock springs 180, 185 associated with the downward force F2 has been relieved and is absent, and the biasing force of the second steer lock spring 185 moves the hollow sleeve member 151 in a direction away from the lock receiver 83 (compare FIG. 2A to the positioning in FIGS. 2B and 4B). The biasing force of the second steer lock spring 185 and associated movement of the hollow sleeve member 151 also moves the steer lock pin 160 away from the locking receiver 83 owing to engagement of the washer 170 by the inner ledge portion 156. This movement is sufficient to move the lower pin portion 166 such that it is no longer contained or otherwise received within the opening 85 of the lock receiver 83, thereby allowing the lock receiver 83, the neck 76 and the wheel 58 to swivel about the swivel axis S when a user moves the patient transport apparatus 30.

When a user wishes to move the steer lock assembly 150 from the non-steer locked state to the steer locked state, or from the steer locked state to the non-steer locked state, the user either applies upward force F1 on the lower foot engagement region 229 (see FIG. 2B) to rotate the foot pedal 210 about the pivot axis R1 in a first rotational direction (shown for illustrative purposes as counterclockwise rotational direction R1' in FIG. 2B) or applies a downward force F3 on the upper engagement region 288 (see FIG. 2C) to rotate the foot pedal 210 about the pivot axis R1 in a second rotational direction (shown for illustrative purposes as clockwise rotational direction R1" in FIG. 2C), depending upon the initial positioning of the foot pedal 210. Additionally or alternatively, the user may apply a force on an opposing end of the foot pedal 210 to place the steer lock assembly 150 in the steer locked state. Any suitable actuation by the user may be employed. Notably, in the embodiment shown in the drawings, actuation is hands-free, which allows the user to maintain control of the patient transport apparatus 30 with their hands, such as by grasping the handle assemblies 57, while changing the mode the patient transport apparatus 30.

While the embodiments described above illustrate a caster assembly 60 that includes both a brake assembly 100 and a steer lock assembly 150, further embodiments may be included where a respective one of the caster assemblies 60 includes only a brake assembly 100, or a steer lock assembly 150. Still further, other embodiments may include a caster assembly 60 that includes neither a brake assembly 100 nor a steer lock assembly 150, with the caveat that at least one of the other caster assemblies 60 includes a steer lock assembly 150.

As noted above, and as best shown in FIGS. 1 and 5-10, an actuator assembly comprises a cable assembly 300 that links and coordinates the movement of an associated pair of the actuators 200, e.g., the foot pedals 210, of an associated coordinated pair of caster assemblies 60 to place a coordinated pair of the caster assemblies 60 in a coordinated manner in one of the neutral mode, the steer locked mode, or the braked mode.

The cable assembly 300 is in the form of a series of one or more cables 310 in which the ends 320, 330 of the cables 310 are coupled to one of a respective pair of the foot pedals 210 of adjacent caster assemblies 60. For illustrative purposes, a single cable 310, corresponding to a single cable assembly 300, is represented in the FIGS. 1 and 5-10, although two or more cables may be used. For ease of description below, the use of the singular cable in describing the embodiments can correspond to multiple cables, or vice versa.

In one representative embodiment, the cable assembly 300 is coupled to the adjacent foot pedals 210 as part of the caster assemblies 60 that are located along one side of the base 34, and in particular along one side of the base frame 35, with one of the foot pedals 210 as a part of the caster assembly 60 at the head end of the base 34 and the other of the foot pedals 210 as a part of the caster assembly 60 at the foot end of the base 34. As shown in FIG. 1 in one illustrative embodiment, the cable assembly 300 is coupled to the adjacent foot pedals 210 along the right side of the base frame 35, whereas FIGS. 5-10 illustrate another alternative embodiment wherein the cable assembly 300 is coupled to the adjacent foot pedals 210 along the left side of the base frame 35.

Still further, in another embodiment (not shown), a pair of cable assemblies 300 could be utilized, in which one of the cable assemblies 300 is coupled to the adjacent foot pedals 210 as a part of the caster assemblies 60 located on the left side of the base 34 and base frame 35, while the other one of the cable assemblies 300 is coupled to the adjacent foot pedals 210 as a part of the caster assemblies 60 located on the right side of the base 34 and base frame 35.

Even still further, it is also contemplated in yet another alternative embodiment (not shown) that a cable assembly 300 could alternatively be used in which one of the cable assemblies 300 is coupled to the adjacent foot pedals 210 as a part of the caster assemblies 60 located the head end of the base 34 and base frame 35, or at the foot end of the base 34 and frame 35. Yet still further, a pair of cable assemblies 300 could be utilized, in which one of the cable assemblies 300 is coupled to the adjacent foot pedals 210 as a part of the caster assemblies 60 located on the head end side of the base 34 and base frame 35, while the other one of the cable assemblies 300 is coupled to the adjacent foot pedals 210 as a part of the caster assemblies 60 located on the foot end side of the base 34 and base frame 35.

As noted above, for illustrative purposes, the representative cable assembly 300 of FIGS. 5-10, described below, is coupled to the adjacent foot pedals 210 along the left side of the base frame 35.

As shown in FIGS. 5, 6, 8 and 9, the first end 320 of the cable 310 is coupled to a securing device, shown here as cable attachment point 340, extending from a first side, shown here as an outward facing side 211, of one of the foot pedals 210. As shown in FIGS. 5, 7, 8 and 10, the second end 330 of the cable 310 is coupled to another securing device, shown here as cable attachment point 345, extending from the first side, shown as the outward facing side 211, of the other one of the foot pedals 210. The cable attachment points 340, 345 are positioned on the outward facing side 211 of the respective one of the foot pedals 210 at a position remote from (i.e., spaced apart from) a respective opening 231 through which the axle pin 230 is positioned, as will be explained further below.

A middle portion 315 of each of the respective one or more cables 310, extends along, or within (shown in FIGS. 6, 7, 9 and 10) as extending within an opening 39 of the base), the base portion 35 of the base 34 between the respective foot pedals 210 of the pair of caster assemblies 60. A first hollow guiding member 350 may be included through which a portion of the first end 320 of the cable 310 extends between the base member 35 and the cable attachment point 340 to aid in maintaining the positioning of the first end 320 of the cable 310 relative to the cable attachment point 340. Similarly, a second hollow guiding member 355 may be included through which a portion of the second end 330 of the cable 310 extends between the base member 35 and the cable attachment point 345 to aid in maintaining the positioning of the second end 330 of the cable 310 relative to the cable attachment point 345. The guiding members 350, 355 may be fixed to the base member 35 in any suitable manner. Additionally, the guiding members may be continuous from one end to the other such that the cable 310 is not exposed between the guiding members 350, 355, but is covered by a single guiding member that is fixed at its ends to the base member 35. The guiding member, in this case, may be a sheath for a push-pull type cable with the sheath being fixed to the base member 35 at each end.

In the embodiments shown in FIGS. 5-10, the cable attachment points 340, 345 are illustrated as extending from the outward facing side 211 of the respective foot pedal 210 corresponding to the exterior of the patient transport apparatus 30. However, in other embodiments, the cable attachment points 340, 345 of the respective foot pedals 210 could be positioned to extend along the opposing inward facing side of the respective foot pedal 210 corresponding to the interior of the patient transport apparatus 30, so long as the pivoting of the foot pedals 210 in opposite directions to maintain the tautness of the cable 300 is maintained. In still further embodiments, it is also contemplated wherein the cable attachment point 340 of the first foot pedal 210 is on the outward facing side 211, while the cable attachment point 345 is on the inward facing side of the second foot pedal 210, or vice versa, again as long as the pivoting of the foot pedals 210 in opposite directions maintains the tautness of the cable 300.

The coupling of the respective ends 320, 330 of the cables 310 to the respective cable attachment points 340, 345 is configured in such a way that when a force is applied to one of the two foot pedals 210 to initiate a rotational movement of the foot pedal 210 in either the counterclockwise direction R1' (see FIG. 2B) or the clockwise direction R1" (see FIG. 2C) about its pivot axis R1, the rotational force is translated from the first foot pedal 210 to the cable 310 of the cable assembly 300 as either linear push force or linear pull force applied to the cable attachment point 340. The linear push force or linear pull force of the cable 310 corresponding to the cable attachment point 340 is then translated to the cable attachment point 345 of second foot pedal 210 as either a linear push force or linear pull force (opposite the linear push force or linear pull force of the cable 310 corresponding to the cable attachment point 340—i.e., a linear push force on the cable attachment point 340 corresponds to a linear pull force on the cable attachment point 345, and vice versa) to initiate rotation of the second foot pedal 210 in either the counterclockwise direction R1' or the clockwise direction R1" about its pivot axis R1. Moreover, the rotational movement of the first foot pedal 210 is coordinated with the rotational movement of the second foot pedal 210 such that the mode of one of the pair of respective caster assemblies 60 is maintained in the same mode as the other one of the pair of caster assemblies (i.e., the modes of each of the pair of coordinated caster assemblies is either in the neutral mode, the steer locked mode, or the braked mode).

Thus, when force applied to the first foot pedal 210 causes the first foot pedal 210 to rotate about its pivot axis R1 such that the first caster assembly 60 is placed in the braked mode, as shown in FIGS. 5 and 6 (corresponding to FIG. 2C), the same force is translated from the first brake pedal 210 to the coupled second brake pedal 210 through the cable 310 of the coupled cable assembly 300 to rotate the second brake pedal 210 about its pivot axis R1 in the opposite direction to also move the second caster assembly 60 to the braked mode, as shown in FIGS. 5 and 7. Similarly, when force applied to the first foot pedal 210 to cause the foot pedal to rotation about its pivot axis R1 such that the first caster assembly 60 is placed in the steer locked mode, as shown in FIGS. 8 and 9 (corresponding to FIGS. 2B and 4B), the same force is translated from the first brake pedal 210 through the cable 310 of the coupled cable assembly 300 to rotate the second brake pedal 210 about its pivot axis R1 in the opposite direction to also move the second caster assembly 60 to the steer locked mode, as shown in FIGS. 8 and 10. While not shown, when force applied to the first foot pedal 210 to cause the foot pedal to rotate about its pivot axis R1 such that the first caster assembly 60 is placed in the neutral mode (see FIG. 2A), the same force is translated from the first brake pedal 210 through the cable 310 of the coupled cable assembly 300 to rotate the second brake pedal 210 in the opposite direction about its pivot axis R1 to also move the second caster assembly 60 to the neutral mode.

In order to maintain the tautness of the cables 310 of the cable assembly 300 as the pair of coordinated foot pedals 210 are rotated in opposite directions in a coordinated manner, the cable assembly 300 is coupled to the respective pair of foot pedals 210 such that the rotational movement of one of the coupled foot pedals 210 about its pivot axis R1, when viewed from an exterior viewpoint as in FIGS. 5 and 8, is in an opposite rotational direction from the other one of the two coupled foot pedals 210 such that the tautness of each respective one of the cables 310 of the cable assembly 300 is maintained at all times. In other words, if the rotational movement of one of the coupled pair of foot pedals 210, when viewed from an exterior viewpoint as in FIGS. 5 and 8, is in a clockwise direction, the other one of the coupled pair of foot pedals 210 is moving in a counterclockwise rotational direction, or vice versa. Stated yet another way, when viewed from an exterior viewpoint as in FIGS. 5 and 8, the first and second actuators 200 (i.e., the foot pedals 210) pivot about their respective pivot axes R1 in opposite directions relative to one another so as to coordinate the movement of the coordinated pair of pedals 210 from the braked state to the unbraked state, or from the steer locked state to the non-steer locked state (i.e., place the pair of pedals in the unbraked or brake state in a coordinated manner, or place the pedals in the steer locked state or non-steer locked state in a coordinated manner). In some versions, the distance between the respective cable attachment points 340 and 345 of the first and second brake pedals 210 remains constant.

Still further, to allow the opposite rotational movement of the respective foot pedals 210 of the paired caster assemblies 60 and to maintain the distance between the respective cable attachment points 340 and 345 as described above, the location of the cable attachment point 340 relative to the respective opening 231 (corresponding to the pivot axis R1) on the first foot pedal 230, is opposite the location of the cable attachment point 345 relative to the respective opening 231 on the second foot pedal 230.

For example, as illustrated when comparing FIGS. 6 and 7 when the respective paired caster assemblies 60 are in the braked mode, the cable attachment point 340 is located above and to the left of the opening 231 of the first foot pedal 210, whereas the cable attachment point 345 is located below and to the left of the opening 231 of the second foot pedal 210. Similarly, as illustrated when comparing FIGS. 9 and 10 when the respective paired caster assemblies 60 are in the steer locked mode, the cable attachment point 340 is located above and to the right of the opening 231 of the first foot pedal 210, whereas the cable attachment point 345 is located below and to the right of the opening 231 of the second foot pedal 210. While not illustrated, but wherein the respective paired caster assemblies 60 are in the neutral mode between the braked mode and steer locked mode, the cable attachment point 340 is located directly above the opening 231 of the first foot pedal 210, whereas the cable attachment point 345 is located directly below the opening 231 of the second foot pedal 210.

Further, each respective one the cables 310 is constructed to have sufficient rigidity to maintain their respective shape as the linear push or linear pull force is translated through the cables 310. Additionally, or alternatively, biasing elements, such as torsion springs, leaf springs, or the like, could be employed to reduce the forces needed to rotate the foot pedals to their respective positions.

Accordingly, the use of the cable assembly 300 to couple together a respective pair of the caster assemblies 60 allows a user to move a respective coupled pair of the caster assemblies 60 between the braked mode, the neutral mode, and the steer locked mode by simply applying a force to either the lower foot engagement region 229 or the upper foot engagement region 228 of one of the coordinated foot pedals 210. Notably, in the embodiment shown in the drawings, the actuation is hands-free, which allows the user to maintain control of the patient transport apparatus 30 with their hands, such as by grasping the handle assemblies 57, while changing the mode of the patient transport apparatus 30. Moreover, the use of the cable assembly 300 to couple together a pair of caster assemblies 60 eliminates the need for the user to move from the head end to the foot end of the patient transport apparatus 30, or vice versa, to place a pair of the caster assemblies 60 in the same mode.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus for transporting a patient, the patient transport apparatus comprising:
   a support structure including:
      a base defining a head end and a foot end, and
      a patient support deck defining a patient support surface to support the patient,
   a first caster assembly coupled to the head end of the base to facilitate movement of the support structure along a floor surface, the first caster assembly comprising a first steer lock assembly;
   a second caster assembly coupled to the foot end of the base to facilitate movement of the support structure along the floor surface, the second caster assembly comprising a second steer lock assembly; and
   an actuator assembly operatively coupling the first and second steer lock assemblies, the actuator assembly including a first pedal operatively coupled to the first steer lock assembly, a second pedal operatively coupled to the second steer lock assembly, and a cable assembly interconnecting the first steer lock assembly and the second steer lock assembly and extending between the head end and the foot end of the base to place the first and second steer lock assemblies in a non-steer locked state or a steer locked state in a coordinated manner, wherein movement of the first pedal in a first direction in response to a force applied by a user causes movement of the second pedal in a second direction, opposite the first direction.

2. The patient transport apparatus of claim 1, wherein each of the first and second caster assemblies respectively further comprise a wheel and a wheel support coupled to the wheel to support the wheel for rotation about a rotational axis and for rotation about a swivel axis as the support structure moves along the floor surface.

3. The patient transport apparatus of claim 2, wherein the first and second pedals pivot about respective first and second pivot axes to place the first and second steer lock assemblies in the non-steer locked state or the steer locked state.

4. The patient transport apparatus of claim 3, wherein the first and second pivot axes are parallel.

5. The patient transport apparatus of claim 3, wherein the non-steer locked state is configured to permit the wheel support and coupled wheel to swivel about the swivel axis and the steer locked state is configured to limit rotation of the wheel support and coupled wheel about the swivel axis.

6. The patient transport apparatus of claim 3, comprising first and second axle pins wherein the first and second pedals are respectively mounted to the support structure with the first and second axle pins extending through openings in the respective first and second pedals.

7. The patient transport apparatus of claim 6, wherein the first axle pin defines the first pivot axis; and
   wherein the second axle pin defines the second pivot axis.

8. The patient transport apparatus of claim 6, wherein the cable assembly comprises a cable, with the cable having a first end and a second end opposite the first end;
   wherein the first end of the cable is coupled to a cable attachment point extending outwardly from the first pedal and remote from the opening in the first pedal; and
   wherein the second end of the cable is coupled to a cable attachment point extending outwardly from the second pedal and remote from the opening of the second pedal.

9. The patient transport apparatus of claim 8, wherein a relative distance between the cable attachment point of the first pedal and the cable attachment point of the second pedal remains constant as the first and second pedals respectfully pivot about the first and second pivot axes in opposite directions.

10. The patient transport apparatus of claim 1, wherein the first caster assembly further comprises a first brake assembly operatively coupled to the first pedal and wherein the second caster assembly further comprises a second brake assembly operatively coupled to the second pedal; and wherein the cable assembly is further configured to place the first and second brake assemblies in a braked state or an unbraked state in a coordinated manner.

11. The patient transport apparatus of claim 10, wherein each of the first and second caster assemblies respectively further comprise a wheel and a wheel support coupled to the wheel to support the wheel for rotation about a rotational axis and for rotation about a swivel axis as the support structure moves along the floor surface.

12. The patient transport apparatus of claim 11, wherein the unbraked state permits the respective wheels of the first and second caster assemblies to rotate about the rotational axis to facilitate movement of the support structure along the floor surface, and wherein the braked state prevents the respective wheels of the first and second caster assemblies from rotating about the rotational axis.

13. The patient transport apparatus of claim 1, wherein the cable assembly comprises a cable, with the cable having a first end and a second end opposite the first end;
  wherein the first end of the cable is coupled to a cable attachment point of the first pedal; and
  wherein the second end of the cable is coupled to a cable attachment point of the second pedal.

14. The patient transport apparatus of claim 13, wherein a relative distance between the cable attachment point of the first pedal and the cable attachment point of the second pedal remains constant as the first and second pedals move in opposite directions.

* * * * *